United States Patent
Kellner et al.

(10) Patent No.: US 12,502,941 B2
(45) Date of Patent: Dec. 23, 2025

(54) MOTOR-VEHICLE TRACTION BATTERY ARRANGEMENT

(71) Applicant: Dr. Ing. h.c. F. Porsche Aktiengesellschaft, Stuttgart (DE)

(72) Inventors: Philipp Kellner, Renningen (DE); Christopher Volkmer, Niefern-Öschelbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 796 days.

(21) Appl. No.: 17/824,986

(22) Filed: May 26, 2022

(65) Prior Publication Data
US 2022/0402345 A1    Dec. 22, 2022

(30) Foreign Application Priority Data

Jun. 17, 2021 (DE) .................. 10 2021 115 697.1

(51) Int. Cl.
| | |
|---|---|
| B60K 1/04 | (2019.01) |
| H01M 10/42 | (2006.01) |
| H01M 10/48 | (2006.01) |
| H01M 50/249 | (2021.01) |

(52) U.S. Cl.
CPC ............. B60K 1/04 (2013.01); H01M 10/425 (2013.01); H01M 10/482 (2013.01); H01M 50/249 (2021.01); B60K 2001/0438 (2013.01); H01M 2010/4271 (2013.01); H01M 2220/20 (2013.01)

(58) Field of Classification Search
CPC .......................... B60K 2001/0438; B60K 1/04
See application file for complete search history.

(56) References Cited

U.S. PATENT DOCUMENTS

| | | | |
|---|---|---|---|
| 10,109,894 B2 * | 10/2018 | Tsujimura ................ | B60K 1/04 |
| 11,095,140 B1 * | 8/2021 | Chen ..................... | H02J 7/0048 |
| 2011/0279087 A1 | 11/2011 | Andres et al. | |

(Continued)

FOREIGN PATENT DOCUMENTS

| | | |
|---|---|---|
| CN | 107614306 A | 1/2018 |
| CN | 111361420 A | 7/2020 |

(Continued)

OTHER PUBLICATIONS

Great Britain Combined Search and Examination Report for Application No. GB2208820.7, dated Dec. 15, 2022, 2 pages.

*Primary Examiner* — Brian L Swenson
(74) *Attorney, Agent, or Firm* — Buchanan Ingersoll & Rooney PC

(57) ABSTRACT

A motor-vehicle traction battery arrangement has a plurality of battery modules arranged in a single horizontal plane (XY) in the vehicle floor, an electrical battery management system and a high-voltage busbar that electrically connects all battery modules and the battery management system to each other. The battery management system serves to monitor all battery modules and has, as functional components at least one contactor as well as, for each battery module, a temperature monitor and/or a voltage monitor. The battery management system is formed by at least two battery management sub-modules, each of which includes some of the totality of all functional components and which are arranged at a distance from each other.

18 Claims, 2 Drawing Sheets

(56) References Cited

U.S. PATENT DOCUMENTS

Figure 1:
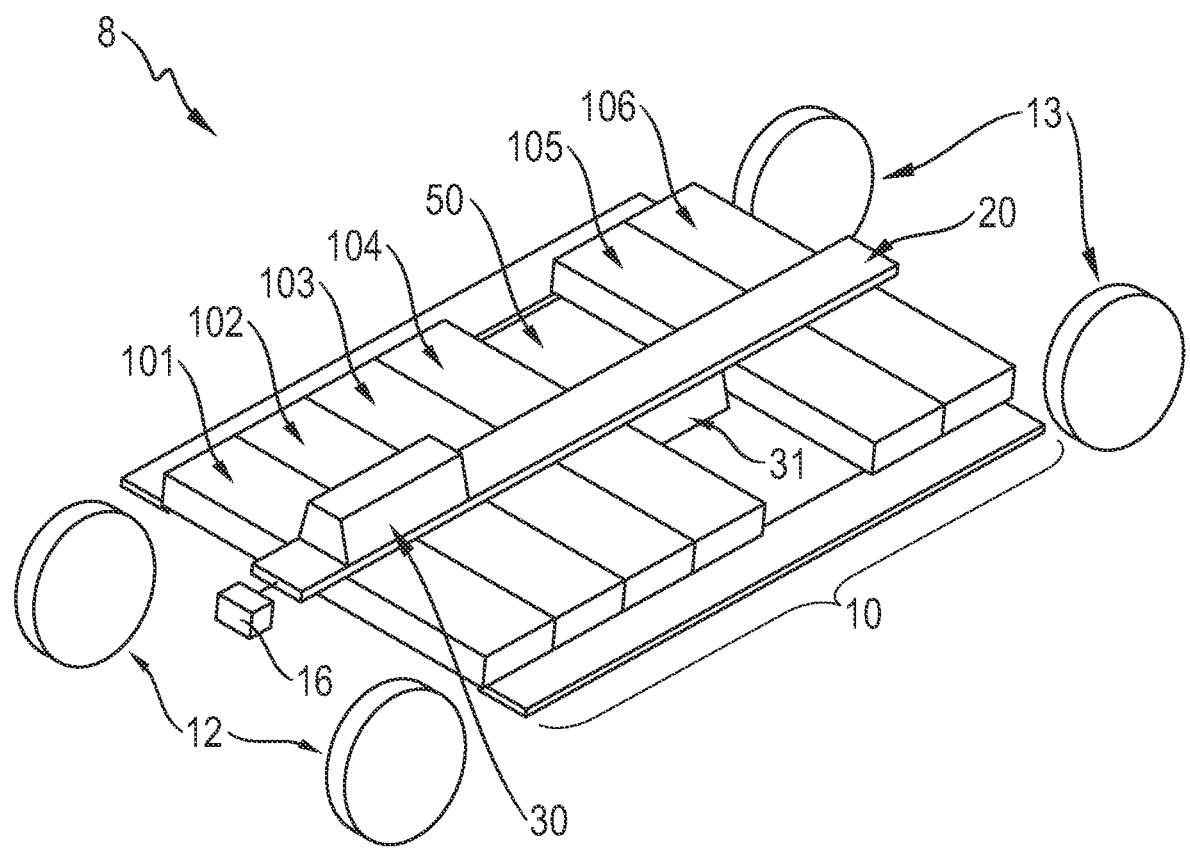

| | | | |
|---|---|---|---|
| 2013/0078498 A1* | 3/2013 | Favaretto | B60L 50/66 |
| | | | 429/158 |
| 2014/0242428 A1* | 8/2014 | Walker | B60L 58/26 |
| | | | 429/61 |
| 2014/0308551 A1* | 10/2014 | Schroeder | B60L 1/003 |
| | | | 429/81 |
| 2018/0170165 A1 | 6/2018 | Nakayama et al. | |
| 2018/0290556 A1 | 10/2018 | Demont | |
| 2021/0129651 A1* | 5/2021 | Klomberg | B60L 50/66 |
| 2021/0234213 A1* | 7/2021 | Okuno | B60K 1/04 |
| 2022/0069405 A1* | 3/2022 | Choi | H01M 50/207 |
| 2024/0010077 A1* | 1/2024 | Perlo | H01M 50/20 |

FOREIGN PATENT DOCUMENTS

| | | |
|---|---|---|
| DE | 102020006705 A1 | 12/2020 |
| GB | 2588589 A | 5/2021 |
| WO | 2017139444 A1 | 8/2017 |
| WO | 2021001046 A1 | 1/2021 |

\* cited by examiner

MOTOR-VEHICLE TRACTION BATTERY ARRANGEMENT

CROSS-REFERENCE TO RELATED APPLICATION

This application claims priority to German Patent Application No. 10 2021 115 697.1, filed Jun. 17, 2021, the content of such application being incorporated by reference herein in its entirety.

FIELD OF THE INVENTION

The invention relates to a motor-vehicle traction battery arrangement having a plurality of battery modules arranged in a single horizontal plane in the vehicle floor and having an electrical battery management system for monitoring all battery modules.

BACKGROUND OF THE INVENTION

In the present case, a battery module is always understood to be a modular combination of a multiplicity of battery cells in a usually fluid-tight and rigid battery-module housing. A battery module is rectangular and usually elongate, being installed in the vehicle floor with its longitudinal extent aligned in the transverse direction of the vehicle. To enable as much battery capacity as possible to be installed in the vehicle, each battery module often extends with its longitudinal extent over practically the entire width of the vehicle and contributes structurally to the transverse stiffening of the motor-vehicle frame. In passenger cars, in particular in rather flat passenger cars, the battery modules are predominantly or in their totality arranged in front of each other in a single horizontal plane, it being the case that, because of their large longitudinal extent, they cannot be installed at the level of the front axle and the rear axle.

Furthermore, provided in the immediate vicinity of the battery modules is an electrical battery management system, which has, as functional components, pyrotechnical isolating systems, contactors, temperature monitors and voltage monitors, the latter separately for each battery module. The battery management system is usually combined in a single structural module, is functionally and spatially very extensive, and therefore often also extends across the entire width of the vehicle and is arranged in front of or behind the totality of all battery modules. This arrangement, however, correspondingly reduces the space available for battery modules in the longitudinal direction between the front axle and the rear axle.

SUMMARY OF THE INVENTION

It would be desirable to increase the total electrical capacity of a motor-vehicle traction battery arrangement arranged in the vehicle floor.

With that aim in mind, a motor-vehicle traction battery arrangement according to aspects of the invention has a plurality of battery modules arranged in a single horizontal plane in the vehicle floor. However, this does not necessarily mean that the totality of all battery modules is arranged in a single horizontal plane, or in the vehicle floor, but at least the majority of all battery modules. Furthermore, there is an electrical battery management system provided in the region of the vehicle floor and directly adjacent to the battery modules. The battery management system serves substantially for the electrical monitoring of all battery modules, and for this purpose has, as functional components, at least one contactor as well as, for each battery module, a temperature monitor and/or a voltage monitor. All battery modules and the battery management system are electrically connected to each other by a high-voltage busbar.

The battery management system is formed by at least two battery management sub-modules, each of which comprises some of the totality of all functional components and which are arranged at a distance from each other. Each battery management sub-module has for this purpose its own sub-module housing, which does not have, or share, a common housing wall with the respective other battery management sub-module. The extensive overall functionality, or the many functional components, of the battery management system are thus divided between at least two modules, this division being able to be realized in a functionally symmetrical or asymmetrical manner. The two battery management sub-modules may be largely identical to each other, but may also have very different functional scopes, for example voltage monitoring and temperature monitoring in one sub-module and the safety devices, i.e. contactors and pyrotechnic isolating systems in the other sub-module. The two sub-modules may also differ from each other in respect of size, but particularly preferably do not differ from each other by more than 50% in respect of volume. The two battery management sub-modules are arranged at a distance from each other, i.e. they are not directly adjacent to each other. However, all battery management sub-modules are directly adjacent to some battery module or to the high-voltage busbar connecting the battery modules. In this way, the high-voltage electrical lines are kept short.

Due to the multi-modularity of the battery management system, the constructional freedom in the design of the vehicle floor is considerably increased, such that in particular the vehicle length available between the front axle and the rear axle in the longitudinal direction can be used exclusively for the placement of the battery modules. The battery management sub-modules, on the other hand, can be arranged where no battery module can be arranged in any case. Furthermore, the battery management sub-modules can be arranged in a more crash-protected manner, which increases the electrical crash safety.

Preferably, the battery management sub-modules are electrically connected to each other by the high-voltage busbar. The high-voltage busbar serves primarily to electrically connect all battery modules to each other. No significant extensions are therefore required for electrically connecting the battery management sub-modules to the battery modules and for electrically connecting the two battery management sub-modules to each other.

Preferably, two battery management sub-modules are arranged at least 20 cm apart from each other in the longitudinal direction of the vehicle. The two battery management sub-modules are electrically connected to each other substantially by the high-voltage busbar, which also has signal lines.

Preferably, at least one battery management sub-module is arranged in the horizontal plane of the battery modules. For example, a battery management sub-module may be arranged directly adjacent to the frontmost or rearmost battery module. Alternatively or additionally, at least one battery management sub-module is particularly preferably arranged, in the longitudinal direction of the vehicle, between two battery modules. Preferably, a clearance is provided on both transverse sides of the battery management sub-module arranged between two battery modules in the longitudinal direction of the vehicle, over the width of the adjacent battery modules in the transverse direction.

For example, the battery management sub-module, as viewed in the transverse direction of the vehicle, may be arranged between two so-called foot garages in the vehicle floor. In this way, the battery management sub-module may be arranged, for example, in the center of the vehicle with its longitudinal extent oriented in the longitudinal direction of the vehicle. In the present case, a foot garage is understood to be the space kept free in the longitudinal direction between two battery modules, which in a four- or five-seat vehicle provides a recess for lower extremities of the rear passengers.

Preferably, at least one battery management sub-module extends symmetrically in the transverse direction of the vehicle over at least 50% of the transverse extent of an adjacent frontmost or rearmost battery module. The two transverse ends of the battery management sub-module are reduced in their longitudinal extent at the level of the edge regions of the adjacent frontmost or rearmost battery module. The reduction of the two transverse ends of the battery management sub-module may be realized in the form of a bevel, such that the total transverse extent of the battery management sub-module is not reduced, but the longitudinal extent is reduced in each case in the edge region. The reduction may also be effected by complete omission, in such a way that the transverse extent of the battery management sub-module is less than 90% of the transverse extent of the adjacent battery module. As a result of the reduction of the longitudinal extent of the transverse ends of the battery management sub-module, the latter can also be arranged in the region of the front axle or the rear axle, between the wheel suspensions of an axle. In this way, the battery management sub-module in question lies in the same transverse plane as the battery modules, but does not reduce the installation space available for the battery modules in the vehicle underbody in the longitudinal direction between the front axle and the rear axle.

Preferably, at least one battery management sub-module may be arranged above the underlying battery modules, and is particularly preferably arranged centrally with respect to the transverse direction of the vehicle, for example in the region of the front center console between the driver's seat and the passenger seat. In this case, the battery management sub-module may be arranged with its longitudinal extent aligned in the longitudinal direction of the vehicle.

BRIEF DESCRIPTION OF THE DRAWING FIGURES

Figure 2:
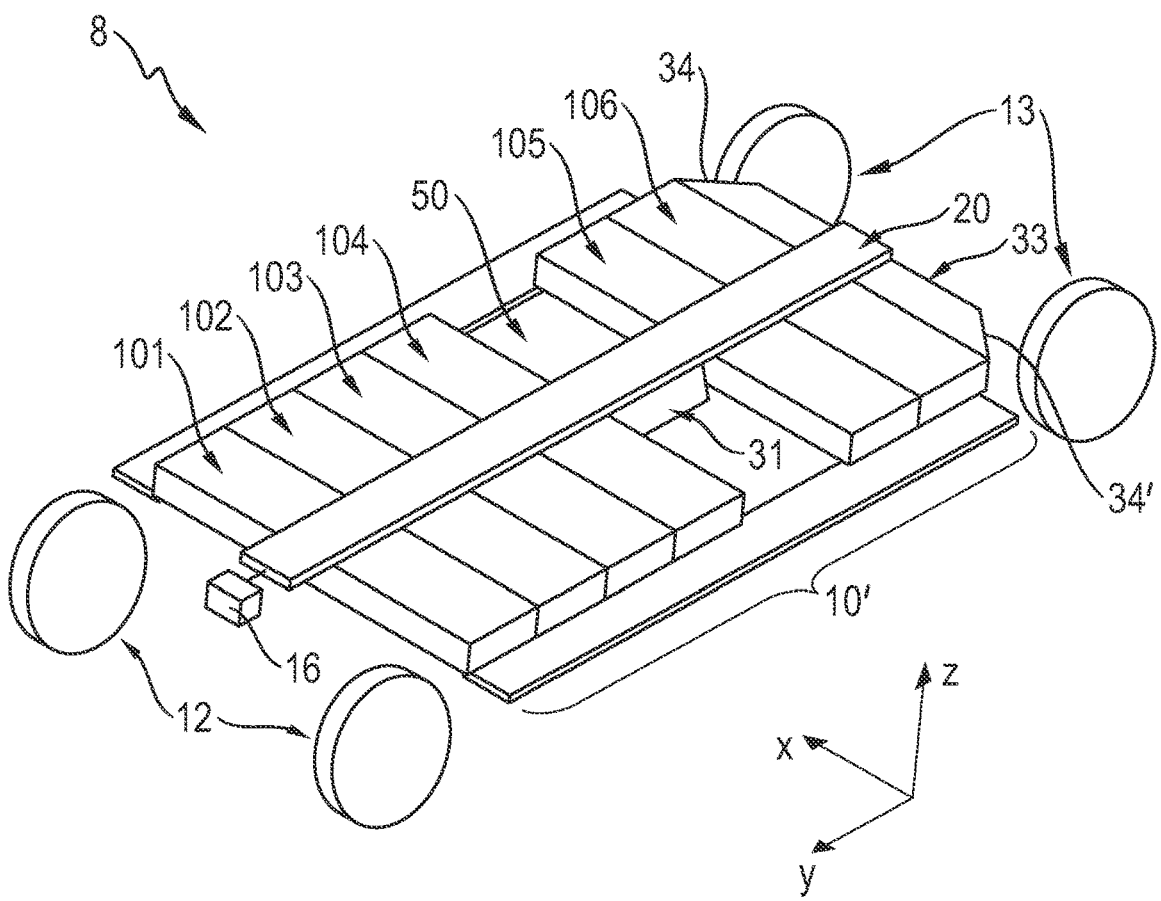
Figure 3:
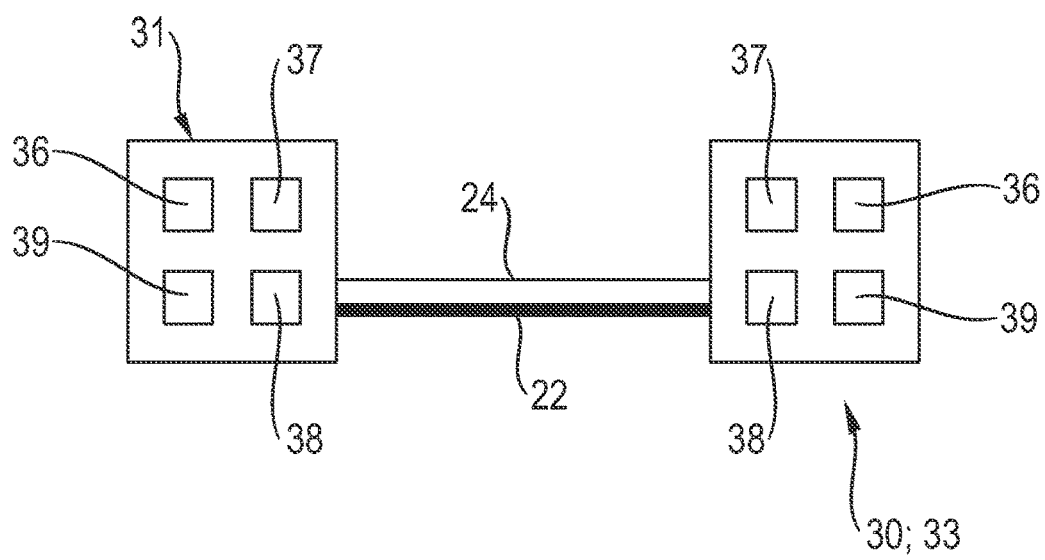

In the following, two exemplary embodiments of the invention are explained in greater detail on the basis of the drawings, in which:

FIG. 1 shows a schematic perspective representation of a first exemplary embodiment of a motor-vehicle traction battery arrangement with a first front battery management sub-module above the battery-module horizontal plane and a second rear battery management sub-module in the battery-module horizontal plane, FIG. 2 shows a schematic perspective representation of a second exemplary embodiment of a motor-vehicle traction battery arrangement with two battery management sub-modules in the battery-module horizontal plane, and FIG. 3 shows a schematic representation of the two battery management sub-modules of FIGS. 1 and 2.

DETAILED DESCRIPTION OF THE INVENTION

FIGS. 1 and 2 each show an embodiment of a motor-vehicle traction battery arrangement 10; 10'. The motor vehicle 8 has an electric traction drive (not represented). A total of six battery modules 101-106 are arranged in the vehicle floor, in a single horizontal plane XY, between a motor-vehicle front axle 12 and a motor-vehicle rear axle 13. Each battery module 101-106 has its own rigid battery-module housing that hermetically shields the battery cells within the battery module. Each battery module 101-106 extends substantially over the entire transverse extent X of the motor vehicle 8, or over the entire transverse extent X of the front axle 12, or of the rear axle 13. The vertical, or the vehicle vertical axis, is denoted by Z.

The battery modules 101-106 in the present case are grouped in such a way that four mutually directly adjacent battery modules 101-104 are arranged adjacent to the front axle 12 and two mutually directly adjacent battery modules 105, 106 are arranged adjacent to the rear axle 13, all battery modules 101-106 being arranged in the longitudinal direction between the front axle 12 and the rear axle 13. Provided between the front four battery modules 101-104 and the rear two battery modules 105,106 there is a clearance 50, having a length in the longitudinal direction of approximately two battery modules, to provide a foot garage for the lower extremities of the rear passengers.

The battery modules 101-106 are electrically connected to each other and interconnected by a high-voltage busbar 20. The high-voltage busbar 20 has a plurality of high-voltage lines 22 and a plurality of signal lines 24, which are represented schematically in FIG. 3, and is electrically connected to a drive controller 16.

In the exemplary embodiment of FIG. 1, an electrical battery management system is realized by two battery management sub-modules 30, 31, which each have a plurality of functional components 36-39 and are arranged at a distance from each another. The functional components 36-39 are respectively a pyrotechnical isolating system as well as, for each battery module 101-106, a respective contactor, a temperature monitor and a voltage monitor.

Each battery management sub-module 30,31 has its own metal sub-module housing and is substantially cuboid-shaped and elongate. The rear battery management sub-module 31 is arranged lying, in the longitudinal direction Y of the vehicle, between the fourth and the fifth battery module 104,105 in the horizontal plane of all battery modules 101-106, with the longitudinal extent of the sub-module 31 aligned in the longitudinal direction Y of the vehicle. The rear battery management sub-module 31 is arranged beneath and adjacent to the high-voltage busbar 20, and divides the clearance 50 into a right clearance half and a left clearance half.

The front battery management sub-module 30 is arranged above the first and the second battery module 101,102 and directly above and adjacent to the central high-voltage busbar 20. Furthermore, the front battery management sub-module 30 is arranged centrally with respect to the transverse direction X of the vehicle. Since each battery management sub-module 30,31 has only some of all functional components 36-39 of the battery management system, the two sub-modules 30,31 are electrically connected to each other via the high-voltage lines 22 and the signal lines 24.

FIG. 2 shows a second exemplary embodiment of a motor-vehicle traction battery arrangement 10'. Here, the front battery management sub-module 31 corresponds to the rear battery management sub-module 31 of the first exemplary embodiment represented in FIG. 1. The rear battery management sub-module 33 of the second exemplary embodiment represented in FIG. 2 is arranged in a crossbar-like manner directly adjacent to the rearmost battery module 106 and lying in the horizontal plane XY of all battery modules 101-106. The rear battery management sub-module 33 is arranged between the two wheels of the rear axle 13. For this reason, the two transverse ends 34, 34' of the battery management sub-module 33 are reduced in their longitudinal extent at the level of the edge regions of the adjacent rearmost battery module 106, in the present case correspondingly beveled.

What is claimed:

1. A motor-vehicle traction battery arrangement comprising:
   a plurality of battery modules arranged in a single horizontal plane (XY), the plurality of battery modules comprising a first grouping of battery modules that are stacked together and a second grouping of battery modules that are stacked together, wherein the first and second groupings are separated by a clearance;
   an electrical battery management system; and
   a high-voltage busbar that electrically connects all of the battery modules and the battery management system to each other,
   wherein the battery management system is configured to monitor all of the battery modules and has, as functional components, at least one contactor as well as a temperature monitor and/or a voltage monitor for each battery module of the plurality of battery modules,
   wherein the battery management system comprises at least two battery management sub-modules arranged at a distance from each other,
   wherein one of the battery management sub-modules is positioned in the clearance and at an elevation beneath the high-voltage busbar, and
   wherein each battery management sub-module comprises some of a totality of all of the functional components.

2. The motor-vehicle traction battery arrangement as claimed in claim 1, wherein the two battery management sub-modules are arranged at least 20 cm apart from each other in a longitudinal direction (Y) of the vehicle.

3. The motor-vehicle traction battery arrangement as claimed in claim 1, the battery management sub-modules being electrically connected to each other by the high-voltage busbar.

4. The motor-vehicle traction battery arrangement as claimed in claim 1, wherein at least one of the battery management sub-modules is arranged in a horizontal plane of the battery modules.

5. The motor-vehicle traction battery arrangement as claimed in claim 1, wherein at least one of the battery management sub-modules is arranged in a longitudinal direction (Y) of the vehicle between two of the battery modules.

6. The motor-vehicle traction battery arrangement as claimed in claim 5, wherein the clearance is disposed (i) on both transverse sides of said one of the battery management sub-modules.

7. The motor-vehicle traction battery arrangement as claimed in claim 1, at least one of the battery management sub-modules being arranged (i) above the battery modules, and (ii) centrally with respect to a transverse direction (X) of the vehicle.

8. A motor vehicle comprising the motor-vehicle traction battery arrangement as claimed in claim 1.

9. The motor vehicle of claim 8, wherein the plurality of battery modules are arranged in a floor of the motor vehicle.

10. A motor-vehicle traction battery arrangement comprising:
    a plurality of battery modules arranged in a single horizontal plane (XY);
    an electrical battery management system; and
    a high-voltage busbar that electrically connects all of the battery modules and the battery management system to each other,
    wherein the battery management system is configured to monitor all of the battery modules and has, as functional components, at least one contactor as well as a temperature monitor and/or a voltage monitor for each battery module of the plurality of battery modules,
    wherein the battery management system comprises at least two battery management sub-modules arranged at a distance from each other, and
    wherein each battery management sub-module comprises some of a totality of all of the functional components,
    wherein at least one of the battery management sub-modules extends symmetrically in a transverse direction (X) of the vehicle over at least 50% of a transverse extent of an adjacent frontmost or rearmost battery module of the plurality of battery modules, and the two transverse ends of said at least one battery management sub-module are reduced in their longitudinal extent at a level of the edge regions of the adjacent frontmost or rearmost battery module.

11. The motor-vehicle traction battery arrangement as claimed in claim 10, wherein the two battery management sub-modules are arranged at least 20 cm apart from each other in a longitudinal direction (Y) of the vehicle.

12. The motor-vehicle traction battery arrangement as claimed in claim 10, the battery management sub-modules being electrically connected to each other by the high-voltage busbar.

13. The motor-vehicle traction battery arrangement as claimed in claim 10, wherein at least one of the battery management sub-modules is arranged in a horizontal plane of the battery modules.

14. The motor-vehicle traction battery arrangement as claimed in claim 10, wherein at least one of the battery management sub-modules is arranged in a longitudinal direction (Y) of the vehicle between two of the battery modules.

15. The motor-vehicle traction battery arrangement as claimed in claim 14, further comprising a clearance disposed (i) on both transverse sides of the battery management sub-module that is arranged between two of the battery modules in the longitudinal direction (Y) of the vehicle, and (ii) between the two battery modules.

16. The motor-vehicle traction battery arrangement as claimed in claim 10, at least one of the battery management sub-modules being arranged (i) above the battery modules, and (ii) centrally with respect to a transverse direction (X) of the vehicle.

17. A motor vehicle comprising the motor-vehicle traction battery arrangement as claimed in claim 7.

18. The motor vehicle of claim 17, wherein the plurality of battery modules are arranged in a floor of the motor vehicle.

* * * * *